June 27, 1961   W. F. STAHL   2,989,870
TRANSMITTING APPARATUS
Filed March 29, 1957
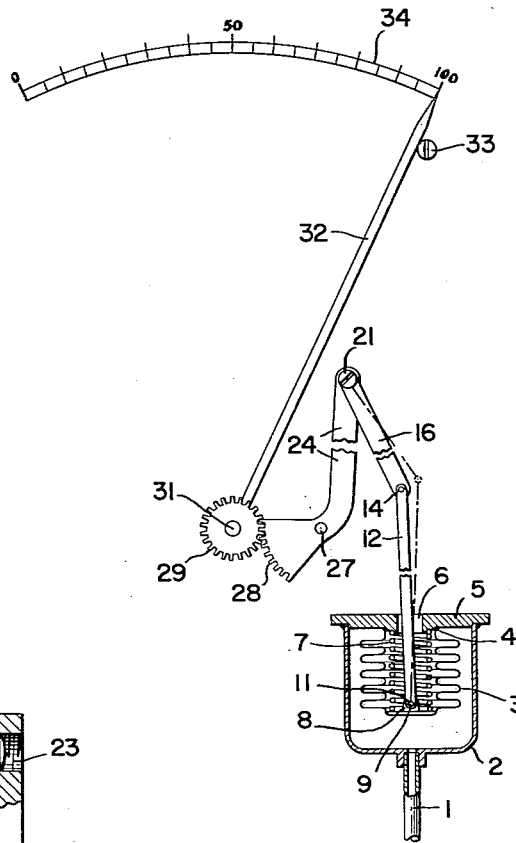
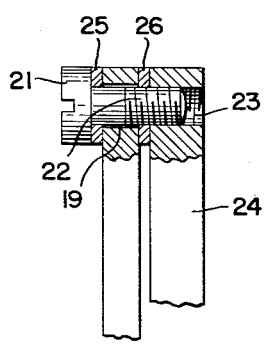
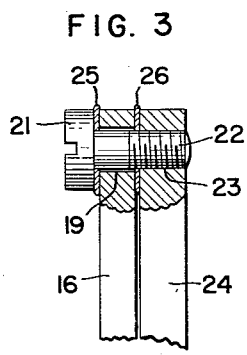
INVENTOR.
WILLIAM F. STAHL
BY Arthur H. Swanson
ATTORNEY.

United States Patent Office 2,989,870
Patented June 27, 1961

2,989,870
TRANSMITTING APPARATUS
William F. Stahl, Davisville, Pa., assignor to Minneapolis-Honeywell Regulator Company, Minneapolis, Minn., a corporation of Delaware
Filed Mar. 29, 1957, Ser. No. 649,477
3 Claims. (Cl. 74—98)

The invention relates to indicators and recorders. More specifically, it relates to instruments which have a driving element consisting of a bellows, Bourdon tube, or spiral, a driven element consisting of an indicator pointer and/or recording pen and a span adjusting linkage therebetween to transmit the motion of the driving element to the driven element. The driving element may be a primary sensing element that is responsive to changes in a variable to be measured, such as temperature, pressure, or rate of flow.

It is the object of this invention to provide a self-adjusting linkage for the aforementioned motion transmitting instrument which will reduce the time that a person is required to spend in adjusting such an instrument in order to make a span adjustment.

It is well known that any one of two randomly picked primary sensing elements, such as bellows, that have been produced by mass production techniques, if used in an indicating instrument of the aforementioned type will cause the pointer of such an instrument to be moved a greater or less distance along the indicating scale than the other bellows will usually do for any given change in the magnitude of the variable being indicated. Even though one bellows may be produced in a manner identical to that of the other bellows the gradient characteristics of the first bellows may be such as to cause an indicator pointer to travel beyond the one hundred percent full scale marking on the indicator when actually it should be indicating only a full scale indication. On the other hand, the gradient that the second bellows possesses may be such as to cause the same type of indicator pointer to travel upscale to a position that falls short of or is beyond the marking on the indicator scale to which the first mentioned bellows moved in this indicator pointer.

To overcome this overtravel and undertravel of pointer problem it has heretofore been necessary to provide a slider and screw adjustment that requires a manual adjustment to be made in the linkage that exists between the primary sensing element and the indicator. Such a manual adjustment is useful in varying the distance such a slider and indicator will move for a given deflection of the primary element. While an arrangement such as that just described and as is shown in the Ullman et al. Patent 2,307,248, filed December 20, 1939, and issued January 5, 1943 can be used to eliminate this pointer overtravel and undertravel problem, such an adjustment is required to be done manually and as such is susceptible to human error.

It is therefore a more specific object of the present invention to provide an indicating and/or recording instrument with an improved span adjusting link means that is useful in overcoming this overtravel and undertravel of a pointer more quickly and more accurately than has heretofore been possible. Such a link means as that described in this application will not need any manual adjustment in order to correctly adjust the span of the indicating or recording instrument. It is therefore another object of the present invention to provide a novel span adjusting linkage for an indicating and/or a recording instrument that is not susceptible to human error.

A better understanding of the present invention may be had from the following detailed description when read in connection with the accompanying drawings, in which:

FIG. 1 shows one form of an indicating apparatus in which a span adjusting means using the aforementioned self-adjusting linkage is employed;

FIG. 2 shows in detail an end elevation view of the self-adjusting link, shown in FIG. 1, in a non-calibrated position; and FIG. 3 shows a detail of a locking screw retaining the self-adjusting link, shown in the aforementioned figures, in a fixed, correctly calibrated position.

Referring to FIG. 1 there is shown a capillary tube 1 having its lower end connected to a temperature responsive bulb, not shown, and its upper end connected to an opening into the inside of the lower portion of the bellows casing 2. Within the casing 2 there is shown a bellows 3 having its open end fixedly attached, at the portion forming its open end 4, to an upper portion 5 of the casing 2 that has an aperture 6. A spring coil 7 is shown having its lower end in contact with the bellows 3 and its upper end in contact with the underside of the casing portion 5. A U-shaped lug 8 is shown fixedly attached to the lower end of the bellows 3. A suitable pivot pin 9 passes through an aperture 11 in the lug 8 and an aperture, not shown, which is in the lower end of the elongated link 12. FIGS. 1 and 2 show the upper end of the link 12 having an aperture 13 and a wrist pin 14 passing therethrough. The wrist pin 14 is shown being retained in a fixed position at 15 in a countersunk aperture formed in an elongated link 16. This pin 14, as is best shown in FIG. 2, rotatably supports the upper end of link 12 and is retained in link 12 by means of a first external cotter 17 on the outer left end of the pin 14, and a washer 18 retained in a longitudinally fixed but rotatable position on a central portion of the pin 14.

The upper end of the link 16, as can best be seen in FIG. 2, is shown containing an aperture 19 and a pin 21 passing therethrough. The right end of the pin 21 is shown containing threads 22 which are in engagement with the threads 23 of the J-shaped member 24. FIG. 2 shows the two friction washers 25, 26 mounted on the pin 21 respectively between the head of the pin 21 and link 16 and between the link 16 and the J-shaped member 24. The threads 22 of the pin 21 as shown in FIG. 2 only partially engage some of the threads 23 in the member 24. FIG. 3, on the other hand, shows the threads 22 of the pin 21 fully engaged with the threads 23 in the member 24 and also show the friction washers 25, 26 in a compressed condition.

The lower portion of the J-shaped member 24 is shown pivotally mounted on a stationary pin element 27. The lower left end portion of the J-shaped member 24 is shown having a gear segment 28. The gear segment 28 is in turn shown in mesh with a gear 29 that is rotatably mounted on a stub shaft 31. The lower end of the pointer 32 is shown protruding downwardly behind the gear 29 and is attached for movement therewith by any conventional connecting means such as by welding. The upper end of the pointer 32 shown in FIG. 1 is shown in contact with a stop member 33. This stop member 33 may be a screw member as shown that is threadedly connected to a stationary member or any other means that will prevent the pointer 32 from travelling beyond the one hundred percent full scale position shown on scale 34.

As has heretofore been pointed out, it has been the practice prior to the present invention to adjust an indicating scale overtravel and undertravel of a pointer by manually adjusting the position of a slider element. The present invention as has also been previously pointed out needs no such manual adjustment to overcome the aforementioned overtravel or undertravel of the pointer.

It should be noted, in order to clearly understand the hereinafter described operation of the indicating apparatus, that a primary sensing element such as a bellows 3 that has been selected for this transmitting apparatus should be of such a nature that is known to produce at least a hundred percent scale indication or more.

In the operation of the indicating apparatus shown in FIG. 1, a bulb, not shown, but which is located on the lower end of the tube 1, is plunged into a predetermined constant low temperature bath which represents the zero percent of scale of the instrument. The pointer 32 will then be in a position opposite the zero percent of scale marking shown on the scale 34. Once this zero percent of scale position is established, the operator then plunges the bulb connected to the other end to the open end of the tube 1 into a constant predetermined higher temperature bath that represents a maximum or one hundred percent full scale position that such an instrument is to measure. Once the operator has performed this operation the self-adjusting linkage will be moved by the action of the primary sensing element 3 to its correctly adjusted one hundred percent full scale position. During the initial stages of this movement of the indicator 32 from its zero to one hundred percent full scale position an increase in pressure applied through the tube 1 from a bulb that is in the constant temperature bath, will cause the bellows 3 to move in an upward direction against the downward force of coil spring 7. This action of the bellows will, in turn, apply an upward force through the pin 9 to the lower end of the link 12. As this force is applied to the link 12 the upper end of the link 12 will transmit the bellows motion through the pin 14 to the link 16. The link 16 will, in turn, transmit this bellows motion in the form of rotary motion about the pivot 27 to the J-shaped member 24. The lower or gear segment portion 28 of the J-shaped member 24 will thus be rotated by the rotary motion applied to its upper end in a counter-clockwise direction. This gear segment motion is transmitted to the gear 29 and a pointer 32 attached thereto. As the gear segment 28 continues to rotate about the pivot 27 in this manner it will rotate the gear 29 and pointer 32 attached thereto in a clockwise direction until the pointer 32 is engaged with the stop 33.

When the pointer 32 engages the stop 33 the stop will then prevent the J-shaped member 24 and gear 29 from transmitting any motion from the bellows to the pointer 32. When the stop is reached by the pointer, if the nature of the bellows selected is such that it is perfectly calibrated, so as to only move the pointer through the zero to one hundred percent full scale position, no further movement will be transmitted by the bellows 3 through the links 12, 16, member 24 and gear 29 to the pointer 32. In this case the screw 21 may be tightened from its then loose position as shown in FIG. 2 to a fixed position such as is shown in FIG. 3 when the links 12 and 16 are in the solid line position shown in FIG. 1.

If, on the other hand, a primary sensing element had been selected whose nature is such that it would cause the pointer to move beyond the one hundred percent scale point if the stop 33 were not present, the pivot pin 14 will then be moved upwardly and to the right in a substantial straight line manner into the dotted circle position shown in FIG. 1 by the bellows 3 when the pointer 32 hits the stop 33. This action will cause the links 12 and 16 connected by this wrist pin 14 to also move to the dot-dash line position as shown in FIG. 1. Once the bellows 3 ceases to transmit any further motion to the pivot pin 14 the screw 21 may then be tightened and placed in the position as is shown in FIG. 3. When the movement of the pin 14 to the right of its solid position shown has been completed and the screw 21 tightened the stop screw 33 may be removed as the instrument will then be correctly calibrated. It can thus be seen that after the wrist pin 14 is in its dotted line position and the screw 21 has been locked in place the instrument will then be provided with a pointer indicating apparatus that will transmit less incremental motion of the bellows to the pointer 32 than it previously was possible to do when in the unlocked position. The reason for this reduction in motion or span adjustment is that for any given upward motion being applied by the bellows 3 to the upper end of link 12 before pin 21 was placed in a locked position the lever arm about which this motion was being applied was the distance between the pivot 27 and the center of the pin 14. However, when 21 is placed in a locked position as shown in FIG. 3 the lever arm distance about which this motion is now being applied to the segment 28 is the distance between the pin 27 and the dotted line position of the pin 14. It can thus be seen that the lever arm about which the bellows 3 is applying its motion in the first mentioned instance is shorter than the lever arm about which this same motion is being applied in the second instance noted supra.

If the nature of the bellows 3 that was selected for the primary sensing element is such that it will give a considerably less overtravel indication than the bellows that has just been described supra the pin 14 will, in this case, be moved to a position that is between the solid line and the dotted line positions shown for this pin in FIG. 1 of the drawing. A similar but a smaller span reduction can thus result by then tightening the screw 21 to the tightened position shown in FIG. 3. The reason why a smaller reduction in the span adjustment occurs when the pin 14 has moved to this latter mentioned position is that the bellows motion that is then transmitted from the link 12 to the gear segment 28 about the pivot 27 will be applied about a lever arm that is shorter than the lever arm between the pivot 27 and the center of the pin 14 about which this bellows force was applied when the pin 14 was in the previously mentioned dotted line position.

Furthermore, since the pin 14 has been locked in a position to the left of the dotted line position the lever arm about which the second selected bellows can apply its motion to move member 24 about its pivot 27 will be less than the lever arm about which the other selected bellows can apply its motion to move member 24 about its pivot. It can thus be seen that when the aforementioned span adjustment has been completed so that the pin 14 is between its solid and dotted line position shown on the drawing that a smaller degree of span adjustment will result when the second selected bellows was used than was the case when the other selected bellows was used. In a similar but reverse manner it can also be observed if the nature of the bellows selected were such as to cause the pin 14 to move to the right of its dotted line position shown in FIG. 1 a greater degree of span adjustment will be made possible than that afforded by the first selected bellows.

After the span of the aforementioned instrument has been adjusted in the manner just described the stop 33 may be removed.

When the aforementioned overtravel of the indicator has been corrected it should be readily seen from the aforementioned remarks that a much more accurate pointer indication of the variable will now be made possible across the entire scale. The reason for this is that this linkage has reduced the amount of incremental indicating pointer motion that will occur for any given increment of motion that the bellows is transmitting to the pointer by way of the self-adjusting linkage.

It should be understood that the motion transmitted to the lower end of the link 12 of this self-adjusting linkage just described may be either the motion that is transmitted by a Bourdon or a spiral or any other motion transmitting primary sensing element such as the bellows 3 shown in FIG. 1.

It should also be understood that while the present invention shows a self-adjusting span linkage being used in a transmitting apparatus that is indicating the magnitude of a variable on an indicating scale, it should also be understood that such a transmitting apparatus could readily be constructed using the self-adjusting span linkage to actuate a recording means such as an arm having a stylus on one of its ends or any other rotatable output member.

The present invention thus primarily concerns itself with a self-adjusting span linkage for an indicating and/or recording instrument which linkage is useful in compensating for the gradient differences that may exist between primary sensing elements that are used in such indicating or recording instruments.

What is claimed is:

1. A span correcting link means comprising, a first link, said link being pivotally connected by means of a friction pivot pin at one of its ends to rotate an indicating pointer actuating lever means about a stationary pivot, said first link being connected at its other end by means of a first pivot pin to one end portion of a second link, said second link having another end portion connected by means of a second pivot pin to a primary sensing element for movement therewith, said first pivot pin acting as a means through which movement of said primary element is transmitted to said lever means in accordance with the magnitude of a variable applied to said primary element, a stop means for preventing said indicating pointer actuating lever means from travelling beyond a predetermined one hundred percent full scale position, and screw means located at said friction pivot to operably attach said actuating lever means in the fixed position on said first link after said actuating lever has been moved beyond the position in which said lever means has engaged said stop means.

2. A span adjusting means for a force to radial motion transforming means, comprising a primary element actuated in a longitudinal direction by said force, a first elongated link operably connected at one end to move with said element and forming one portion of a self-adjusting link means, a second elongated link angularly displaced from the elongated axis of said first link forming a second portion of said self-adjusting link means, a wrist pin operably connecting the other end of said first link to one end of said second link, a friction pivot pin pivotally connecting the other end of said second link to one end of a lever integrally connected to a gear segment that is mounted on a stationary pivot, gear means in mesh with said segment and operably connected to move a pointer across an indicating scale, a pointer stop at one end of said scale to prevent the pointer from going beyond a predetermined one hundred percent force indicating position and said connection between said primary element and said self-adjusting link means being operably arranged to move said wrist pin pivot in an upward direction during movement of said pointer up to its one hundred percent position and to move said wrist pin pivot in a lateral direction thereafter to a correctly adjusted span position and screw means on said friction pivot pin to fixedly connect said second link to said lever when said wrist pin has been moved to said last mentioned position.

3. A self-adjusting link means for changing the span of an instrument that is useful in sensing and measuring the magnitude of a variable, comprising a pivot pin, two links rotatably supported on said pin at one of their ends and protruding in an angularly displaced direction from said pin, said other end of one of said links being operably connected for upward movement with a driving member that is displaced in accordance with the magnitude of said variable, said other end of said other link being operably engaged for pivoted movement with one end of a lever that is mounted on a stationary pivot, an indicating pointer operably connected for movement with the other end of said lever, a stop means for preventing said pointer and said lever from moving beyond a predetermined point during said upward movement of said driving member and means for fixedly connecting said end of said other link to said lever after said pointer has engaged said stop and after said driving member and said other end of said one of said links have been moved upwardly by said variable to a predetermined position.

References Cited in the file of this patent

UNITED STATES PATENTS

| | | |
|---|---|---|
| 1,234,126 | Bristol | July 24, 1917 |
| 1,664,776 | Heise | Apr. 3, 1928 |
| 1,978,665 | Beecher | Oct. 30, 1934 |
| 2,304,682 | Edmonds | Dec. 8, 1942 |
| 2,527,385 | Alix et al. | Oct. 24, 1950 |